United States Patent [19]

LaGow

[11] Patent Number: 4,662,105

[45] Date of Patent: May 5, 1987

[54] THERMAL REED DESIGN FOR CONTROLLING THE TEMPERATURE OF PLANTS

[76] Inventor: Herman E. LaGow, 9336 Harvey Rd., Silver Spring, Md. 20910

[21] Appl. No.: 621,184

[22] Filed: Jun. 15, 1984

[51] Int. Cl.$^4$ .............................................. A01G 13/00
[52] U.S. Cl. ............................................................ 47/2
[58] Field of Search ................ 47/2; 165/45; 123/408, 123/403

[56] References Cited

U.S. PATENT DOCUMENTS

| Re. 30,599 | 5/1981 | Yagi et al. | 123/408 |
|---|---|---|---|
| 3,274,769 | 9/1966 | Reynolds | 165/45 |
| 3,828,845 | 8/1974 | Waters | 165/45 |
| 4,030,549 | 6/1977 | Bouck | 165/45 |
| 4,444,249 | 4/1984 | Cady | 165/45 |
| 4,452,303 | 6/1984 | Bontje et al. | 165/45 |

FOREIGN PATENT DOCUMENTS 54969285  5/1982  U.S.S.R. .................................. 47/2

Primary Examiner—Robert A. Hafer
Assistant Examiner—Bradley M. Lewis
Attorney, Agent, or Firm—Schwartz, Jeffery, Schwaab, Mack, Blumenthal & Evans

[57] ABSTRACT

Disclosed are a device and a method for utilizing the thermal energy in the soil to protect against damage to plants, such as citrus trees, from cold weather and to promote the growth of plants. The device comprises a heat pipe having an evaporator section which extends into the soil in the vicinity of the root system of the plants and extracts heat from the soil. The heat is then transferred to a condenser section which extends above ground and radiates and convects the heat to the plant. This also refrigerates the root system of the plant to extend the dormancy period. Also disclosed is a method for providing a supply of water to a plant, comprising the use of a heat pipe to create a temperature gradient around the root system of the plant, whereby water from the surrounding soil is caused to flow toward the plant.

27 Claims, 6 Drawing Figures

THERMAL REED DESIGN FOR CONTROLLING THE TEMPERATURE OF PLANTS

BACKGROUND OF THE INVENTION

The present invention concerns a device for utilizing the thermal energy stored in soil to assist in the growth of a variety of plants and to protect the plants against frost and other cold weather conditions. Particularly, the present invention concerns a device and process in which a heat exchange device removes heat from the soil, in the vicinity of the roots of the plants, and transfers the extracted heat to the plants above the surface of the ground. This transfer of heat produces a number of beneficial effects for the plant, both as regards its root system and as regards the portion above ground.

Heat removal from the soil according to the present invention provides, with respect to one aspect of the invention, protection of the plants from frost and other cold weather conditions. Heretofore, a variety of means have been used to achieve this end. For example, fuel-burning individual heaters have been utilized in orchards in close proximity to the trees. This so-called "smudge pot" method has many advantages including smoke pollution, slow response time, significantly high fuel costs, and an inability to place the heaters in close proximity to the trees or plants to be protected. Much of the heat produced is therefore lost to the open sky. Additionally, fans have been utilized to blow either heater-created warm air or warm air from the higher strata of the atmosphere onto the trees. This method has also been unsuccessful because the fans have been effective in only limited areas. Conventional methods of orchard heating using the most efficient oil burners (return stack heaters) require from 1 million to 10 million BTU/hr/acre, even when augmented with wind machines which return some of the hot gases back down to the tree level. Such methods require fuel costs of at least about $50/acre/hr. Accordingly, they are seldom used in areas where the risk of freezing is low, e.g., in Texas.

Another method for protecting orchards is described in U.S. Pat. No. 2,350,621. According to this method, a plurality of pipes are embedded in the soil with a stem portion extending above-ground in the region of the plants or trees to be heated. A heating medium is provided which is circulated through the pipes. U.S. Pat. No. 4,216,614 also describes a system of conduits embedded in the ground, through which a heating medium is passed and by which heat is radiated to the atmosphere. Like the previous method, the latter methods require a significant energy expenditure for operation, but moreover, they require an enormous and generally prohibitive capital investment.

Increasing fuel costs, especially recently, have directed attention to providing processes for protecting agricultural crops which utilize other means of energy. One of these alternative energy supplies is geothermal energy. U.S. Pats. No. 3,470,943 and No. 3,521,699 describe the utilization of geothermal energy from deep within the earth for warming the ground in areas of severe cold. The geothermal heat is pumped to near the surface of the ground, after which it is utilized in conduit systems which have been embedded in the soil. This process, however, also involves a complex and prohibitively expensive conduit system which must extend to significant depths.

As an alternative to providing heat to the above-ground portion of the plant to prevent damage due to frost, suggestions have been made to extend the dormancy period of trees to avoid early frosts. U.S. Pat. No. 3,890,740 describes a method for retarding fruit budding by circulating a cooling fluid around the trunks of trees to maintain the interior temperature below 38° F. and to control tree hydration and bud development. Such proposals likewise involve prohibitive levels of capital investment and high operating costs.

The present invention provides a device and method which achieve both of the above objectives, i.e., protection of plants against cold weather damage by means of a system requiring reasonable capital investment and low operating costs. Other advantages are achieved as well.

SUMMARY OF THE INVENTION

It is therefore an object of the present invention to provide a device and method for extracting heat from the soil in proximity to plants to provide the plants with favorable heat-related effects.

An important object of the present invention is the provision of a device and method for extracting heat from the soil and radiating and convecting the heat to an area of a plant above ground to protect the plant from damage due to frost and freezing conditions.

Another object of the invention is to provide a device and method which cool the root structure of plants thereby increasing the dormancy period of the plant and thus protecting against frost damage.

Yet another object of the invention is to provide a device and method which cool the soil thereby providing for more favorable growth conditions during summer.

Still another object of the present invention is to provide a device and method wherein the device is positioned near the root system of a plant, especially an immature plant, and wherein the device extracts heat from the soil, thus establishing a continuous thermal gradient through the soil thereby causing moisture flow to the roots.

An additional aspect of the invention is to provide a device and method wherein the device is selectively positioned near the root zone of young transplanted plants among an otherwise mature planting, to provide moisture to the plants as a supplemental watering means.

Also, an object of the invention is to provide a device and method which function to provide moisture to plants in areas which experience small amounts of precipitation, e.g., semi-arid regions undergoing land reclamation or de-desertification.

A further object of the invention is to provide a device and method which achieve the above-mentioned objects without resulting in pollution which must be expelled into the environment, but instead use the solar energy stored in the soil.

In accomplishing the foregoing objects, there has been provided in accordance with one aspect of the present invention an apparatus for use with plants, especially trees, for transferring ground heat from the soil to the above-ground portion of the plant, comprising a closed, evacuated structure having an evaporator section, a condenser section and a working fluid which is cyclically transferred between the evaporator section and the condenser section, wherein the evaporator section is positioned in the soil in proximity to the root structure of the plant form to remove heat from the soil and the condenser section is positioned in proximity to the main stem of the plant to transfer the heat by radiation and convection from the soil to the plant's trunk and canopy.

In accordance with another aspect of the present invention, there has been provided a method for protecting a plant from cold weather damage, comprising the steps of installing at least one heat pipe device in the vicinity of the plant so that an evaporator section of the heat pipe is buried beneath the surface of the ground and a condenser section of the heat pipe is positioned beneath the canopy of the plant; selectively extracting heat from the ground area around the plant by means of the heat pipe; and selectively transferring the extracted heat by radiation and convection from the condenser section of the heat pipe to the stem and canopy of the plant. Preferably the amount of heat extracted from the area around the roots is sufficient to extend the period of dormancy of the plant.

In accordance with yet another aspect of the invention, there has been provided a method for providing a supply of water to a plant, especially an immature plant, comprising the steps of installing at least one heat pipe device in the vicinity of the root portion of the plant so that an evaporator section of the heat pipe is buried beneath the surface of the ground and a condenser section of the heat pipe extends above the ground; and selectively extracting heat from the ground area around the plant by means of the heat pipe in an amount sufficient to produce a temperature gradient in the ground area, whereby water from the surrounding soil is caused to be transported toward the root area of the plant.

Other objects, features and advantages of the present invention will become apparent from the detailed description of preferred embodiments, when considered with the figures of drawing which follow.

DETAILED DESCRIPTION OF PREFERRED EMBODIMENTS

Figure 1:
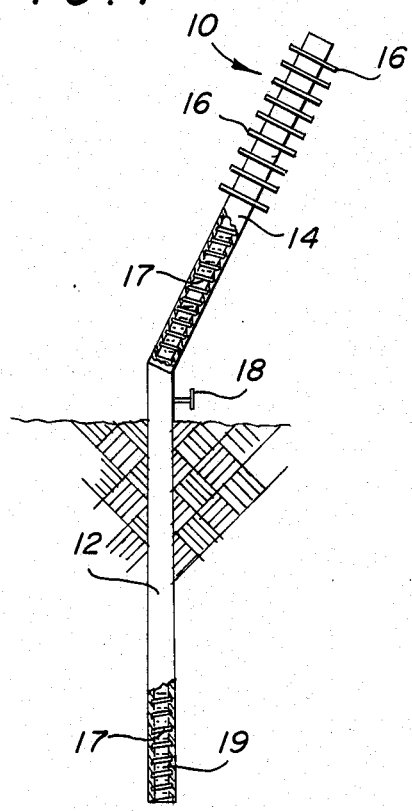
FIG. 1 is a schematic side view, partially cut away, of one embodiment of a thermal reed according to the invention.

The present invention provides a useful means for preventing frost damage to citrus trees under usual types of freezing conditions, i.e., clear sky, radiation-type cooling. None of the conventional methods is effective against the relatively rare (first time in Florida, 1962; first time in Texas, 1983) tree-killing advective freezing conditions. On nights of severe cold temperatures occurring under clear sky conditions, such as occurred in Texas in 1949, 1950, 1951, and 1962 a system designed according to the present invention can provide another 1° or 2° C. protection, which can constitute the critical difference between severe damage and minor or no damage to the orchard. Even under mild advective freezing conditions, the present invention can provide a significant degree of protection by an appropriate placement and concentration of the thermal reed devices, due to the fact that these devices can be placed in the close proximity of individual trees. Since the extent of the cold damage sustained by citrus trees depends on the amount of time at or below critical temperatures, modest temperature gains of only a few degrees can significantly reduce the time of exposure and resulting damage. Previous observations indicate that large trees with greater heat capacity (200 Joules/°C.) and canopy insulating properties are warmer than small trees and often survive cold nights when smaller trees are killed. It has been determined that as little as 100 watts/tree results in a measurable temperature increase. The efficiency of heat released directly under the canopy by a thermal reed used according to the invention is evident. With 130 trees/acre this would provide only 13 KW/acre. Radiation calculations show heat losses at 0° C. to be 300 KW/acre (1 million BTU/hr) and to be at least 150 KW at wood-killing temperatures of $-5.5°$ C. In California 8 to 13 KW of infrared radiation/acre has been ineffective when the lamps were above the trees and illuminated only the outer leaves and the soil between the trees.

The present device is based on the principle of a heat pipe. The heat pipe, which is a relatively inexpensive device, may be in a variety of shapes; however, a heat pipe in the shape of a rod is preferable for the present applications. A portion of the heat pipe (referred to hereinafter as a "thermal reed" is inserted into the soil in proximity to the root structure of a plant, such as a tree, with the remaining portion of the thermal reed extending in a substantially vertical manner above the surface of the ground. The portion of the thermal reed above ground is positioned in close relationship to the main stem of the plant. This has the advantage of permitting the heat applied to the plant to be directed to a location directly beneath the plant, so that more effective and efficient use can be made of each calorie of heat applied.

The reed itself comprises essentially two functional sections. The first section, which is positioned below ground, functions as an evaporator, and the second section, positioned above ground in close relationship to the stem, functions as a condenser. The thermal reed is a closed system which is evacuated and includes a working fluid which functions to transfer the heat between sections. In essence, the transfer of heat is accomplished as follows. The condensed working fluid returning from the condenser positioned above ground enters the evaporator section wherein the heat from the soil produces a phase change in the working fluid from liquid to vapor, i.e., the working fluid retains a heat essentially equal to the latent heat of vaporization of the fluid. The vapor then rises through the thermal reed to the condenser section where the heat is transferred from the thermal reed to the plant to be heated, thereby resulting in a second phase change of the working fluid, this time from a vapor to a liquid. The condensed liquid then flows through the thermal reed, preferably merely by the force of gravity, to the evaporator, completing the heat exchange cycle.

The size of the reeds and the depth to which the reeds are implanted can also vary. The depth to which the reeds are implemented normally varies between about a few inches and as much as 7 feet, with the portion above ground ranging from about 1 foot to 7 feet. Typical reeds have a diameter of about 1 inch to 4 inches and a length of about 2½ to 10 feet. The reeds can have a straight shape or they can be bent at an angle, e.g., so that the portion extending above ground is inclined at an angle of up to about 30° or more from the vertical. Of course, many other more complex shapes are possible but are not preferred in order to minimize production cost. Heat transfer properties of the reeds are, of course, dependent on size.

The thermal reed casing can be made from any material which is environmentally compatible with the soil, such as metal (e.g., aluminum, stainless steel or copper) or plastic or metal/plastic laminated materials. Preferably the casing comprises a thermoplastic resin, and most preferably is polyvinylchloride (PVC). The working fluid is selected from fluids which are compatible with the casing and which have good heat transport and pressure characteristics. A preferred working fluid is butane. Butane, because of its pressure, allows for thinner and lower cost container walls and also for better conductivity through the evaporator and the condenser.

The reed may also include a wetting surface to which the condensed working fluid can contact and be returned to the evaporator section. This protects against entrainment of the codnensed fluid in the rising vapor. The wetting surface can be selected from any number of designs, for example, a wick structure may be used. A preferred wetting surface design according to the invention is an internal groove, preferably a spiral groove, or a helical spring. A wick is not necessary in the present structure, since the condensate return is promoted by gravity, i.e., the thermal reed is operating in the reflux mode.

Most effective operation, the thermal reeds according to the invention include some means of selectively activating and deactivating them, since in certain applications, such as frost protection, there are only limited periods of time during which the protective heating action is needed. At times when it is not needed, it is desirable to conserve heat in the ground. One means to accomplish this is to provide a shut-off valve in the thermal reed between the evaporator and condenser portions. Such a valve can, of course, be manually actuated upon demand; however, it is preferred to employ an automatically actuated valve responsive to an external condition, preferably ambient temperature. A thermal switch is most suitable and is uncomplicated, e.g., a bimetallic element which opens the valve at a predetermined cold temperature. See, for example, Brennan and Groll, in 2nd International Heat Pipe Conference, April 1976, for discussion on heat pipe design.

Various steps can be taken to enhance the heat transfer ability of the thermal reeds according to the invention. Heat transfer from the condenser portion occurs both by radiation and convection. One simple and preferred means for enhancing convective heat transfer involves an increase in heat transfer area, for example, by the expedient of adding fins around the outer circumference of the thermal reed.

In another embodiment of the invention, heat transfer can be controlled by providing a below-ground condenser portion of the thermal reed and by providing that the below-ground condenser portion extend only a small distance under the surface of the soil, e.g., about ½-1 inches. Then an auxiliary watering system can be used (often already present at the growing site) to wet the ground and thereby increase its thermal conductivity by a factor of as much as 10. Such a system can also be used effectively as a means for "switching on" the thermal reed heating system. An irrigation system activated by a thermostatic control would have the effect of automatically turning on, or at least turning up, the present heating system. In this embodiment the top layer of the soil absorbs the heat given off by the condenser portion of the heat pipe and then transfers the heat to the tree trunk and canopy located adjacent and above. Other means can also be taken to increase the thermal conductivity of the ground around the reed, e.g., surrounding the reed with a denser, more heat conductive filler material, such as a mixture of sand and cement.

The present invention is applicable to a wide variety of plants including both evergreen and deciduous varieties. An especially important application of the present invention is in groves and orchards of citrus and other fruit-bearing trees. Other applications include garden crops and vineyards.

With regard to protection against frost and other cold conditions which may damage a deciduous tree, the thermal reed has an advantageous dual effect. It warms the part of the plant above the ground to offset the cold atmosphere, and as a long-term effect, it refrigerates the root system of the plant to increase the dormancy period of the plant so that the plant will still be dormant when spring frosts occur.

In addition to the above effects, cooling the soil around the root system produces a temperature gradient through the soil in the vicinity of the root system which results in the transportation of moisture in the soil from the warmer soil to the cooler soil around the roots. The soil volume which is affected by the induced thermal gradient is up to 100 times larger than the volume of the soil around the root system. Such a result is particularly significant with regard to small, young transplants which typically require supplemental waterings. The moisture which collects around the roots can provide the water required by the transplants. This is especially true in orchards, nurseries and the like which have a highly moist soil due to irrigation. The application of the device and method of the present invention selectively to seedlings planted randomly throughout an orchard as replacement stock can avoid the added cost of dispatching personnel to specially water the new stock, a cost which is becoming prohibitive.

In addition, this transport phenomena can be advantageously used to economically expand growing areas to regions otherwise unsuitable because of insufficient water supply. By the use of thermal reeds according to the invention around a plant's root system, needed water, which may be in the soil in arid and semi-arid areas, is automatically transported to the plants. This can make land recovery and de-desertification projects economically feasible in locations where they otherwise would not be.

The specific design of the thermal reed may vary depending upon its application. In this regard, reference is now made to the figures of drawing.

FIG. 1 is a schematic side view of one embodiment of a thermal reed 10 according to the invention, shown embedded in the ground. Reed 10 is comprised of a lower, evaporator portion 12 and an upper condenser portion 14. Preferably, the condenser portion 14 includes a plurality of fins 16 in order to enhance the convection heat transfer effect of the device. The reed also preferably embodies a shut-off mechanism in the form of a valve 18, which is most preferably an automatic, temperature responsive bimetallic element-activated valve, preferably located near the entry of the reed into the ground. Condenser portion 14 can be at a slight angle with respect to evaporator portion 12, if desired. This does not affect the gravity return of the working fluid 19 back into the evaporator portion 12. In order to facilitate this return, however, and to uniformly distribute the working fluid about the circumference of the reed, a spiral groove 17 is preferably provided in the inside wall of the reed. The thermal reed is of course a closed, evacuated system wherein only the working fluid is contained therein.

Figure 2:
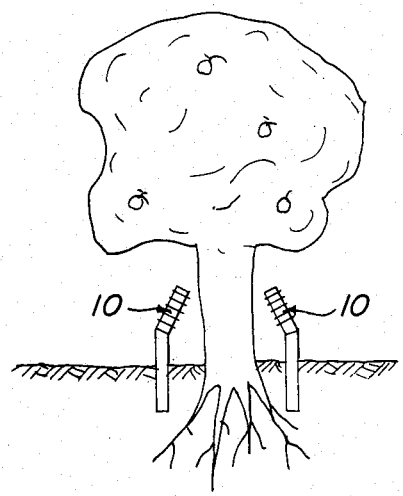
FIG. 2 is a schematic representation of one embodiment of the present invention, wherein a plurality of thermal reeds are placed around a mature tree.
Figure 3:
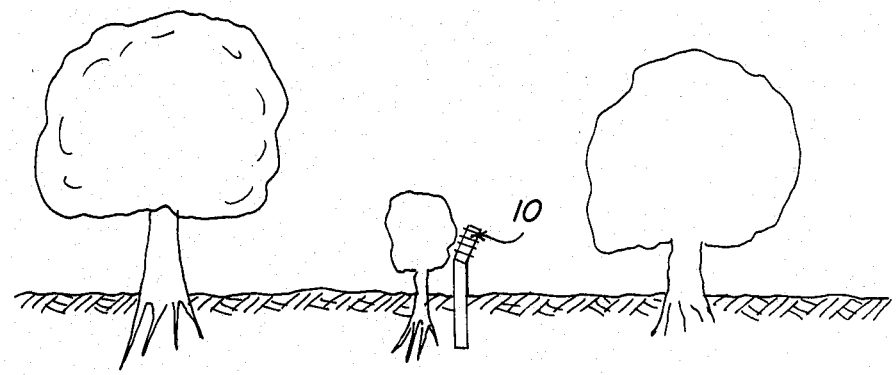
FIG. 3 is a schematic representation of the use of at least one thermal reed in the vicinity of the root system of an immature tree.
Figure 4:
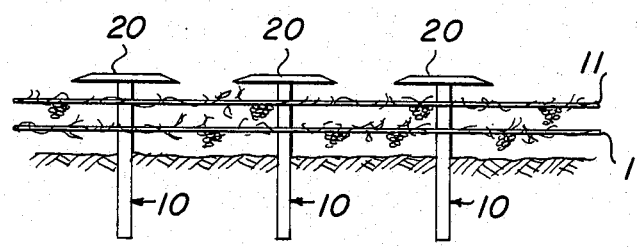
FIG. 4 is a schematic representation of the use of thermal reeds in conjunction with vine-like plants.
Figure 5:
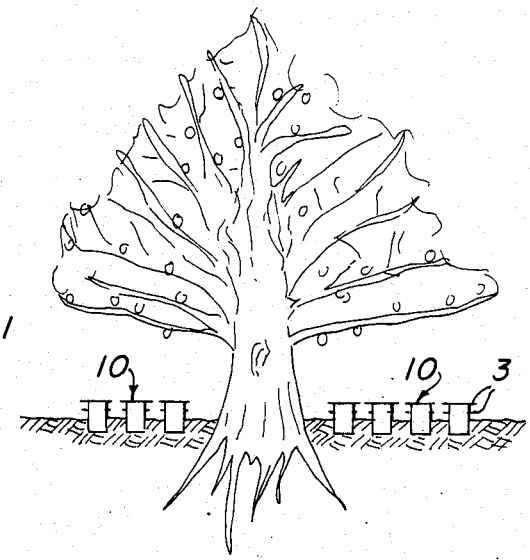
FIG. 5 schematically illustrates the use of a plurality of thermal reeds in the vicinity of a deciduous tree.

FIGS. 2-5 illustrate the thermal reed in four different applications. These applications are not limitive, but are only examples of applications to which the thermal reeds may be put. In FIG. 2, plural thermal reeds 10 are shown with a citrus tree, a member of the family of evergreen trees, while FIG. 5 illustrates the use of the reeds 10 with a deciduous tree. FIG. 3 illustrates the application of a single thermal reed 10 with a small transplanted seedling.

FIG. 4 shows the thermal reeds 10 applied to supported plants, such as grape vines. In this embodiment, the reeds have replaced the stakes which are normally used as supports for wires 11 and for the vines themselves. Each reed includes a circular disk hat member 20 which diffuses heat radially over the vines. Essentially, the reed design can vary between a variety of shapes depending on its application.

Figure 6:
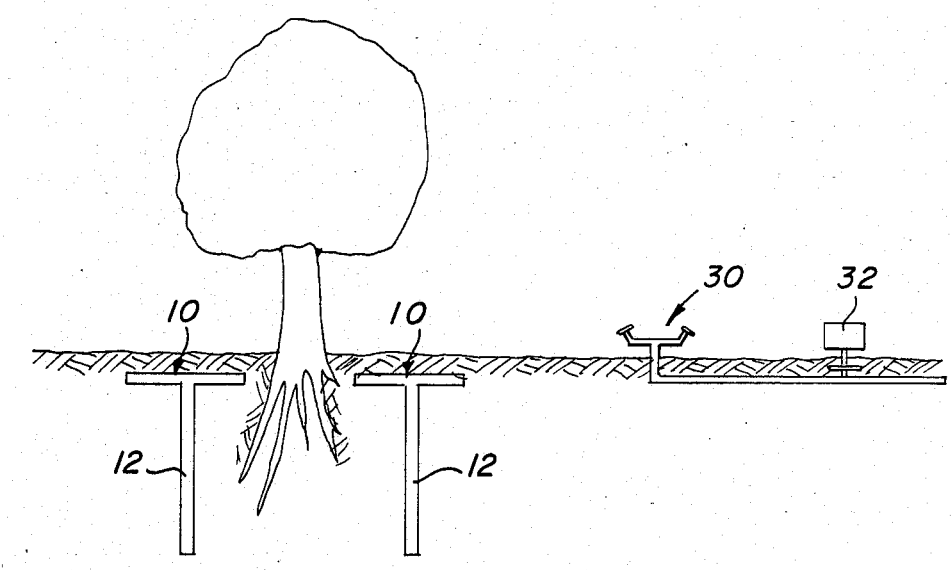
FIG. 6 is a schematic representation of an alternative arrangement of thermal reeds near a tree.

FIG. 6 illustrates yet another embodiment of the thermal reeds according to the invention. In this embodiment, the reeds 10 include an evaporator portion which is designed to be implanted deeply within the ground, and a condenser portion 12 is designed for burying just below the surface of the ground. As a result, the heat transfer coefficient of the ground in the vicinity of the condenser portion can be increased by wetting, for example, by means of a watering system 30. If the watering system includes a temperature-activated on-off control system 32, the step of turning the water on at a predetermined ambient temperature can be employed as an effective means of switching on the heating system to provide its protective effect against dangerous freeze conditions.

The number of reeds used depends on the type of plant, the size of the reed, the locale, the age of the plant and other factors. Normally deciduous trees will require more but shorter reeds than citrus trees. The present invention has the advantage of modular design, which can be adapted to all citrus and fruit growing areas.

Initial tests were conducted with thermal reeds, fabricated by Q-Dot Corporation, Garland, Texas. The reeds have standard heat pipe construction, with collectors and convectors adapted to collect heat from the soil and release it under the canopy of a tree. The reeds are constructed of steel tubing 3.8 cm OD; the collector, in the soil, is 213 cm long; the convector, 122 cm long; is inclined 30° from the vertical and is covered with spiral fins, 2/cm and 1.4 cm high. The area for convection is 8,200 cm$^2$ and the area for radiation is 2,190 cm$^2$.

The reed's performance of a 10° C. temperature difference is 9.2 watts for radiation and 26 watts for natural convection. Under moderate wind conditions this 35 watt heater would be increased to 100 watts. A further increase in performance is achieved by including a shut-off valve, by which the convector is effectively "exposed" only on nights when highest performance is needed.

A test orchard of ten-year-old Ruby Red grapefruit is used. Tree spacing is 4.25 m in the row and 7.3 m between rows. Trees averaged 4.25 m tall with a 4.9 m spread. Canopies came to the ground and overlapped in the tree row.

Thermal reeds are installed, 3 per tree, around two trees. The soil in the orchard is Mercedes clay. At each test tree, two holes 5 cm in diameter and 2.2 m deep are augered in the soil at points about 1.2 m from the trunk on the west and south side of the tree. Thermal reeds are placed in the holes so that the convector is within the tree canopy and pointed toward the trunk. To insure intimate contact between the soil and the collector, any void space is backfilled with dry soil obtained at the site. For the third reed at each tree, a 10 cm hole is augered, the reed placed in the same manner as above and the void filled with a 1:3 mixture of cement and sand. The orchard is flood irrigated the following day to compact the soil around reeds.

Temperature sensing was by means of copper-constantan thermocouples. Data loggers (Omnidata Polycorders) are used to obtain continuous temperature records at 30 minute intervals from 18 points. An additional 40 points are read periodically on cold nights using manual switches and a potentiometer. Recording hygrothermographs are located 1.5 m above ground close to the trunks of 2 heated and 1 control tree.

The temperature of the soil is measured at depths of 1, 30, 60, 90, 120 and 180 cm and at distances of 30, 60 and 90 cm from a reed. The temperature of each reed is measured at the 150 cm depth in the soil and about midway on the convector. The temperature of the tree was measured on 2 test and 2 control trees at: the south side of the trunk 30 cm above ground; leaves within the canopy approximately 1.5 m above ground at 3 points around the tree; leaves within the canopy 2 m above ground at 2 points around the tree; exposed leaves 2 m above ground at 2 points on the outer canopy.

On the evening of 21 December a massive polar air mass arrived. With complete cloud cover and wind northerly 3-10 m/second from 21 to 26 December, this was an advective freeze. Temperature was below 0° C. from 0600 hours 22 December until 1200 hours 26 December; below −4° C. for 30 consecutive hours, below −6° C. for 9 hours, below −8° C. for 1 hour (FIG. 2). Temperatures critical for citrus trees were of longer duration than in either the 1951 or 1962 tree-killing freezes in Texas. This freeze was entirely advective, while in both 1951 and 1962 the lowest temperatures occurred on nights having clear sky, wind calm and radiational cooling.

On the night of 24, 25 December, when the lowest temperature was reached, wind ranged from 2.6 m/sec at 0100 hours to 4.4 by sunrise. At 0730, 25 December air temperature at the 150 cm level in a standard shelter was −8.7° C. Thermal reeds, like conventional cold protection systems, were to effective under these advective conditions. In the case of milder advective freeze conditions, a beneficial effect can be accomplished according to the present invention by placing the two or more thermal reeds as close to the tree trunk as possible on the north side of each tree. As a result of this arrangement, the wind will blow the heat given off by the reeds onto the tree trunk, thereby raising the temperature of the trunk by 1° C. or more.

On 29 December with another frontal passage, the cloud cover began to break up. By 1800 hours the sky was clear, the wind north at 4.3 m/sec and the air temperature at the 150 cm level in a shelter −1.7° C. Wind speed continued to drop during the night reaching 2.5 m/sec at 2400 hours and 1.0 m/sec at 0400 hours. Wind direction ranged from 333° to 358°, predominately north but with a westerly component.

Taking −5° C. as a temperature at which wood damage is likely, depending of course on the amount of time involved, then the thermograph traces reveal the west control tree to have been below −5° C. for 1.6 hours with a minimum of −6; heated tree 48-19 below −5° C. for 1 hour with a minimum of −5.6; the east heated tree, 48-21, no time below −5° C. with a minimum of −4.8° C.

On this night of near radiation conditions, when wind movement varied from 2.5 m/second at midnight to 1 m/second at 0400 and 2.2 m/second at 0500, the performance of the 100 watt/tree thermal reed system with these winds was greater than 300/watts/tree. The thermal reeds reduced the time below the critical temperature for 1 heated tree and eliminated the time below critical for the other.

Under radiational freeze conditions the installed reed system will heat the large trees inside their canopies more than 1° C. and smaller trees, with the same installation, 2° to 4° warmer than similar sized control trees. Additional benefits to trees will occur when all of the trees in an orchard are heated.

What is claimed is:

1. A system for protecting a plant from cold weather damage, comprising:
   at least one plant having a canopy and a stem, growing in a portion of ground exposed to the outdoors and having a root system located beneath the ground;
   at least one heat pipe device installed in the vicinity of said plant, said heat pipe device having an evaporator section buried beneath the surface of the ground, a condenser section positioned beneath the canopy of said plant and a working fluid which is cyclically transported between said evaporator section and said condenser section;
   means, including said evaporator section of said heat pipe positioned adjacent to the root system of said plant, for selectively extracting heat from the ground area around the root system of the plant to refrigerate the root system of the plant; and
   means, including said condenser section of said heat pipe device positioned beneath the canopy of said plant, for selectively transferring the heat extracted from the area around the root system of the plant by radiation and convection from the condenser section of the heat pipe device to the stem and canopy of the plant.

2. A system as defined in claim 1, further comprising means for assisting the return of the condensed working fluid to said evaporator section.

3. A system as defined in claim 2, wherein said condensed working fluid return means comprises an internal groove.

4. A system as defined in claim 1, wherein said structure comprises an essentially longitudinally extending rod shape.

5. A system as defined in claim 1, further comprising means for activating and deactivating the heat pipe device.

6. A system as defined in claim 5, wherein said activating/deactivating means comprises a valve.

7. A system as defined in claim 5, wherein said activating/deactivating means further comprises a means for selectively activating said valve in response to a sensed condition.

8. A system as defined in claim 7, wherein said sensed condition is temperature and said selective activating means comprises a bimetallic activating member.

9. A system as defined in claim 1, further comprising external fins attached to the exterior surface of said condenser section to enhance heat transfer.

10. A system as defined in claim 4, further comprising a circular disk-shaped cover member attached to the top of said rod shape, for radially diffusing heat of convection given off by said condenser portion.

11. A system as defined in claim 1, wherein said plant is a tree having a trunk and wherein said condenser section is positioned adjacent said trunk.

12. A system as defined in claim 1, wherein said condenser section is positioned only a small distance beneath the surface of the ground.

13. A system as defined in claim 1, wherein the casing of said apparatus comprises a thermoplastic resin.

14. A method for protecting a plant from cold weather damage, comprising the steps of:
   installing at least one heat pipe device in the vicinity of the plant so that an evaporator section of the heat pipe is buried beneath the surface of the ground in proximity to the root system of the plant and a condenser section of the heat pipe is positioned beneath the canopy of the plant;
   selectively extracting heat from the ground area around the root system of the plant by means of said heat pipe to refrigerate the root system of the plant; and
   selectively transferring the extracted heat by radiation and convection from the condenser section of the heat pipe to the stem and canopy of the plant.

15. A method as defined in claim 14, wherein the plant is an evergreen tree.

16. A method as defined in claim 15, wherein the plant is a citrus tree.

17. A method as defined in claim 14, wherein the plant is a deciduous tree.

18. A method as defined in claim 14, wherein the plant is a deciduous vine-like plant.

19. A method as defined in claim 18, wherein the plant is a grape vine.

20. A method as defined in claim 14, wherein the heat is extracted from the area around the roots of the plant.

21. A method as defined in claim 20, wherein the amount of heat extracted from the area around the roots is sufficient to induce semi-dormancy in evergreens or extend the period of dormancy of the plant.

22. A method for providing a supply of water to a plant, comprising the steps of:
   installing at least one heat pipe device in the vicinity of the root portion of the plant so that an evaporator section of the heat pipe is buried beneath the surface of the ground and a condenser section of the heat pipe extends above the ground; and
   selectively extracting heat from the ground area around the root portion of the plant by means of said heat pipe in an amount sufficient to produce a temperature gradient in said ground area of the root portion, whereby water from the surrounding soil is caused to be transported toward the root area of said plant.

23. A method as defined in claim 22, wherein said plant comprises an immature tree.

24. A system as defined in claim 2, wherein said condensed working fluid return means comprises a helical spring.

25. A method for inducing semi-dormancy in evergreens or extending dormancy in plants, comprising the steps of:
   installing at least one heat pipe device in the vicinity of the plant so that an evaporator section of the heat pipe is buried beneath the surface of the ground in proximity to the root system of the plant and a condenser section of the heat pipe is positioned beneath the canopy of the plant; and
   selectively extracting heat from the ground area around the root system of the plant by means of said heat pipe to refrigerate the root system of the plant.

26. A method for heating a grove of plants, comprising the steps of:
   installing a plurality of heat pipe devices throughout the groove, wherein each of said plurality of heat pipe devices is positiond in the vicinity of a plant so that an evaporator section of the heat pipe is buried beneath the surface of the ground in proximity to the root system of the plant and a condenser section of the heat pipe is positioned beneath the canopy of the plant;
   selectively extracting heat from the ground area around the root system of the plant by means of said heat pipe to refrigerate the root system of the plant; and
   selectively transferring the extracted heat by radiation and convection from the condenser section of the heat pipe to the stem and canopy of the plant.

27. A method for inducing semi-dormancy in evergreens or extending dormancy in plants, comprising the steps of:
   installing at least one heat extraction device beneath the ground in the vicinity of the root system of the plant; and
   selectively extracting heat from the ground area around the root system of the plant to refrigerate the root system of the plant by means of said heat extraction device.

* * * * *